US007848223B2

(12) United States Patent
Budampati et al.

(10) Patent No.: US 7,848,223 B2
(45) Date of Patent: Dec. 7, 2010

(54) REDUNDANTLY CONNECTED WIRELESS SENSOR NETWORKING METHODS

(75) Inventors: Ramakrishna S. Budampati, Maple Grove, MN (US); Soumitri N. Kolavennu, Minneapolis, MN (US); Patrick S. Gonia, Maplewood, MN (US); Vinayak S. Kore, Bangalore (IN); Smriti Narang, Ahmedabad (IN)

(73) Assignee: Honeywell International Inc., Morristown, NJ (US)

( * ) Notice: Subject to any disclaimer, the term of this patent is extended or adjusted under 35 U.S.C. 154(b) by 1587 days.

(21) Appl. No.: 11/144,321

(22) Filed: Jun. 3, 2005

(65) Prior Publication Data
US 2006/0274671 A1 Dec. 7, 2006

(51) Int. Cl.
G08C 15/00 (2006.01)
H04W 4/00 (2009.01)
H04L 12/56 (2006.01)
(52) U.S. Cl. .................. 370/216; 370/338; 370/390
(58) Field of Classification Search ............... None
See application file for complete search history.

(56) References Cited

U.S. PATENT DOCUMENTS

| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,614,945 A | 9/1986 | Brunius et al. |
| 4,812,785 A | 3/1989 | Pauker |
| 4,843,638 A | 6/1989 | Walters |
| 5,392,003 A | 2/1995 | Nag et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis et al. |
| 5,451,898 A | 9/1995 | Johnson |
| 5,481,259 A | 1/1996 | Bane |
| 5,642,071 A | 6/1997 | Sevenhans et al. |
| 5,659,303 A | 8/1997 | Adair, Jr. |
| 5,726,603 A | 3/1998 | Chawla et al. |
| 5,767,664 A | 6/1998 | Price |
| 5,809,013 A | 9/1998 | Kackman |

(Continued)

FOREIGN PATENT DOCUMENTS

CH 673184 2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner*—Pankaj Kumar
*Assistant Examiner*—Marcus R Smith
(74) *Attorney, Agent, or Firm*—Crompton Seager & Tufte LLC

(57) ABSTRACT

Methods and devices for operating a wireless network including redundant communication. Methods involving redundantly connected nodes are discussed including addressing methods and/or methods of creating groups for such redundant communication. The use of primary and secondary redundant connections is discussed. Also, devices for implementing such methods.

16 Claims, 9 Drawing Sheets

U.S. PATENT DOCUMENTS

| | | | |
|---|---|---|---|
| 5,847,623 | A | 12/1998 | Hadjichristos |
| 5,963,650 | A | 10/1999 | Simionescu et al. |
| 5,987,011 | A | 11/1999 | Toh |
| 6,052,600 | A | 4/2000 | Fette et al. |
| 6,058,137 | A | 5/2000 | Partyka |
| 6,091,715 | A | 7/2000 | Vucetic et al. |
| 6,125,109 | A | 9/2000 | Fuerter |
| 6,175,860 | B1 | 1/2001 | Gaucher |
| 6,353,846 | B1 | 3/2002 | Fleeson |
| 6,366,622 | B1 | 4/2002 | Brown et al. |
| 6,401,129 | B1 | 6/2002 | Lenander |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,845,087 | B1 | 1/2005 | Holdrege et al. |
| 6,901,066 | B1 | 5/2005 | Helgeson |
| 6,944,121 | B1 | 9/2005 | Weste et al. |
| 6,990,137 | B2 | 1/2006 | Smee et al. |
| 7,072,304 | B2 | 7/2006 | Ng et al. |
| 7,164,651 | B2 | 1/2007 | Weste et al. |
| 7,242,294 | B2 | 7/2007 | Warrior et al. |
| 2002/0011923 | A1 | 1/2002 | Cunningham et al. |
| 2002/0071413 | A1 | 6/2002 | Choi |
| 2002/0085622 | A1 | 7/2002 | Dhar et al. |
| 2002/0141479 | A1 | 10/2002 | Garcia-Luna-Aceves et al. |
| 2003/0002446 | A1 | 1/2003 | Komaili et al. |
| 2003/0053555 | A1 | 3/2003 | McCorkle et al. |
| 2003/0063585 | A1 | 4/2003 | Younis et al. |
| 2003/0151513 | A1 | 8/2003 | Herrmann et al. |
| 2003/0198280 | A1 | 10/2003 | Wang et al. |
| 2004/0023617 | A1 | 2/2004 | Mahany et al. |
| 2004/0028023 | A1 | 2/2004 | Mandhyan et al. |
| 2004/0029553 | A1 | 2/2004 | Cain |
| 2004/0042473 | A1 | 3/2004 | Park et al. |
| 2004/0063455 | A1* | 4/2004 | Eran et al. .................. 455/525 |
| 2004/0090943 | A1 | 5/2004 | da Costa et al. |
| 2004/0253996 | A1 | 12/2004 | Chen et al. |
| 2005/0041591 | A1 | 2/2005 | Duggi et al. |
| 2005/0157697 | A1 | 7/2005 | Lee et al. |
| 2005/0281215 | A1 | 12/2005 | Budampati et al. |
| 2006/0104205 | A1 | 5/2006 | Strutt et al. |
| 2006/0153089 | A1 | 7/2006 | Silverman |
| 2006/0198337 | A1* | 9/2006 | Hoang et al. ................. 370/329 |
| 2007/0002786 | A1* | 1/2007 | Herrmann .................. 370/328 |
| 2007/0077927 | A1 | 4/2007 | Zhao et al. |
| 2007/0258508 | A1* | 11/2007 | Werb et al. .................. 375/140 |

FOREIGN PATENT DOCUMENTS

| | | |
|---|---|---|
| DE | 4344172 | 6/1995 |
| EP | 0607562 | 7/1994 |
| EP | 0893931 | 1/1999 |
| WO | WO 00/70572 | 11/2000 |
| WO | 2006007521 | 1/2006 |

OTHER PUBLICATIONS

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE Infocom 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bambooweb.com/articles/o/s/OSI_model.html, "Bambooweb OSI model,"Bambooweb Dictionary, 5 pages, printed May 23, 2005.

http://www.dailywireless.org/modules.php?name=News &file=article&sid=871, "Location by Triangulation—Not," Daily Wireless, 2 pages, printed May 2, 2005.

http://www.unstrung.com/document.asp?site=unstrung &doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al. "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

Kulik et al., "Negotiation-Based Protocols for Disseminating Information in Wireless Sensor Networks," Wireless Networks, vol. 8, pp. 169-185, May 2002.

Pei et al., "Low Power TDMA in Large Wireless Sensor Networks," IEEE, pp. 347-351, 2001.

Taherian et al., "Event Dissemination in Mobile Wireless Sensor Networks," IEEE International Conference, pp. 573-575, Oct. 27, 2004.

* cited by examiner

REDUNDANTLY CONNECTED WIRELESS SENSOR NETWORKING METHODS

RELATED APPLICATIONS

The present application is related to U.S. patent application Ser. No. 11/144,291 filed on even date herewith, entitled REDUNDANTLY CONNECTED WIRELESS SENSOR NETWORKING METHODS, the disclosure of which is incorporated herein by reference.

FIELD

The present invention is related to the field of wireless networks. More specifically, the present invention relates to methods of redundantly connecting sensor nodes to a base station.

BACKGROUND

Wireless communication systems are being considered for use in broader applications, including sensor networks and other networks where information from a first location is to be routed to a base node. New and reliable configurations for such systems are needed.

SUMMARY

The present invention in several illustrative embodiments provides methods and devices for operating a wireless network including redundant communication. An illustrative method embodiment uses redundantly connected nodes, and provides several addressing methods. Some such embodiments include the use of group addressing and primary and secondary redundant connections.

Another illustrative embodiment makes use of a redundant network in association with a non-redundant network such as a Zigbee protocol network is discussed. Some embodiments include devices operating as data relaying nodes and devices operating as data sending nodes, wherein the devices are specially adapted for achieving their respective functions.

DETAILED DESCRIPTION

The following detailed description should be read with reference to the drawings. The drawings, which are not necessarily to scale, depict illustrative embodiments and are not intended to limit the scope of the invention.

As used herein, the term "associate" is used in its more general sense as indicating the that two or more devices become aware of one another and take steps to establish a protocol for communicating with one another by identifying each other as "associated" devices. The term "associate" is not limited, unless specifically noted, to the specialized manner set forth by Zigbee or other communication protocols.

Figure 1:
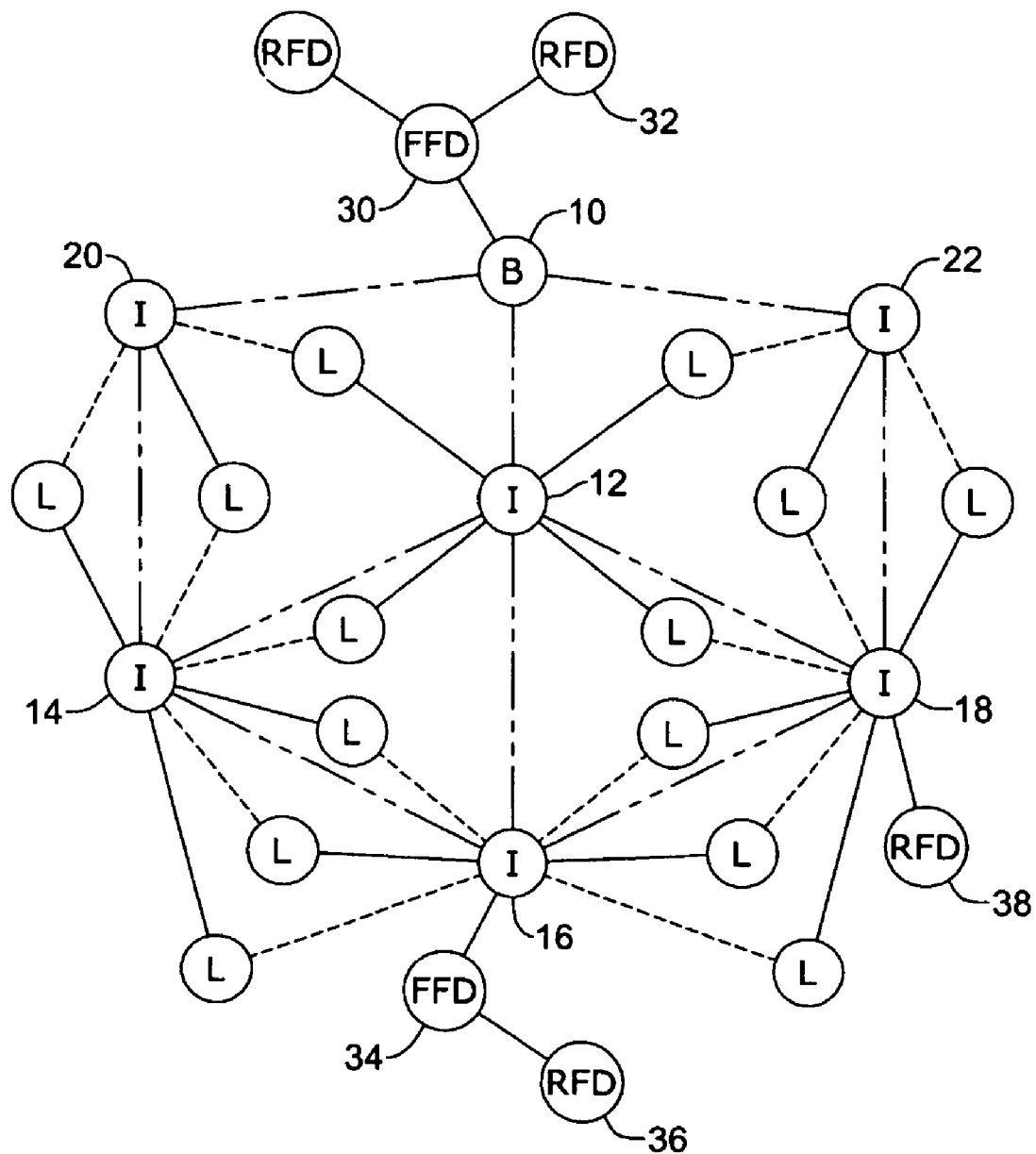
FIG. 1 illustrates an example wireless network having a base station, several infrastructure nodes, and several leaf nodes.

FIG. 1 illustrates an example wireless network having a base station (B), several infrastructure nodes (I), and several leaf nodes (L). Most, if not all, of the communicative couplings shown in FIG. 1 are intended to indicate wireless communication. The network includes a base node 10 that is communicatively coupled to a number of infrastructure nodes (I-nodes). Some I-nodes 12, 20, 22 communicate directly with the base node 10, while other I-nodes 14, 16, 18 send data through hops to reach base node 10. The I-nodes are communicatively coupled to a number of leaf nodes (L-nodes).

The illustrative embodiment shows the L-nodes being redundantly connected to I-nodes. Other networks, for example, networks under the Zigbee protocol or otherwise in accordance with IEEE 802.15.4, do not call for redundant connectivity.

If the network shown in FIG. 1 is placed as a sensor network, for example, some or all of the L-nodes may be battery powered devices, sometimes referred to as energy constrained devices (ECD). An ECD may have multiple modes including a low power sleep mode and an awake mode. While asleep, an ECD is out of communication with the rest of the network. While awake, an ECD is capable of transmitting and, often, receiving messages.

The L-nodes could be defined as reduced function devices (RFD) at least because some are not always available for full communication in the same manner as the I-nodes, and therefore may not have the same level of programming for data hopping purposes as the I-nodes. As used herein, however, the terms RFD and full function device (FFD) are used to refer to Zigbee or other non-redundant networks, while L-node and I-node refer to devices configured for redundant networking. Some I-nodes will be further configured to allow them to operate as FFD's when communicating with an RFD or when relaying data generated by an RFD through a hopping sequence, and as I-nodes when communicating with or relaying data generated by an L-node.

Another set of terminology may consider the leaf nodes as examples of data sending nodes, while the infrastructure nodes are data relaying nodes. Likewise, an RFD may be a data sending node and an FFD may be a data relaying node. The terminology may be used to indicate that data sending nodes are nodes in which data originates, though the data sending nodes may not perform the task of receiving and retransmitting data addressed to other devices. Data relaying nodes may receive and retransmit data while also originating data when desired. The data sending nodes may also receive data that is addressed to them, including, for example, acknowledgements, addressing or scheduling information, etc.

In some embodiments, the data sending nodes may be nodes which provide access to a network layer from another network layer. For example, a data sending node may receive data gathered in a different network and send data in a network as shown in FIG. 1. This may be useful, for example, where a wireless system is retrofitted to an existing facility having an older, local sensor network, with a data sending node used to move data from the old network onto the new network.

With respect to the illustrative base node 10, the base node may be given various descriptive terms used in the art. For purposes herein, the base node 10 may be considered as a destination node for one or more networks, where a destination node serves as the destination for data transmitted within a network.

Certain methods and examples for operating a system having the I-nodes and L-nodes of FIG. 1 are shown and described in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, and copending U.S. patent application Ser. No. 10/905,971, entitled WIRELESS ROUTING SYSTEMS AND METHODS, filed Jan. 28, 2005, the disclosures of which are incorporated herein by reference. For example, in some embodiments discussed in these patent applications, first and second non-overlapping redundant paths may be defined from the leaf nodes L to the base node 10.

As noted above, the collection of I-nodes and L-nodes may be configured for redundant connectivity of the L-nodes. However, as further shown in FIG. 1, there may be additional devices that are neither I-nodes nor L-nodes. The illustrated network provides for interconnectivity of more than one type of network. More specifically, devices using the Zigbee protocol terminology are shown. These include an FFD 30 directly communicating with the base node 10. FFD 30 is shown also communicating with an RFD 32. Additionally, an FFD 34 communicates with I-node 16 as well as RFD 36. Finally, an RFD 38 is shown communicatively coupled to I-node 18.

One inventive aspect of the system as shown in FIG. 1 is the provision of more than one network layer within the same network system. For example, I-node 18 receives communications from I-nodes 12, 16, 22, several L-nodes, and an RFD 38. As such, I-node 18 is configured to receive, identify, filter, and/or handle various communications from each of these sources. Communications coming from the L-nodes may be treated differently from the communications coming from the RFD 38 and/or other I-nodes 12, 16, 22. Further, if communication from FFD 34 is routed from I-node 16 to I-node 18, this communication may also be treated differently from other messages received from I-node 16 by I-node 18.

Figure 2:
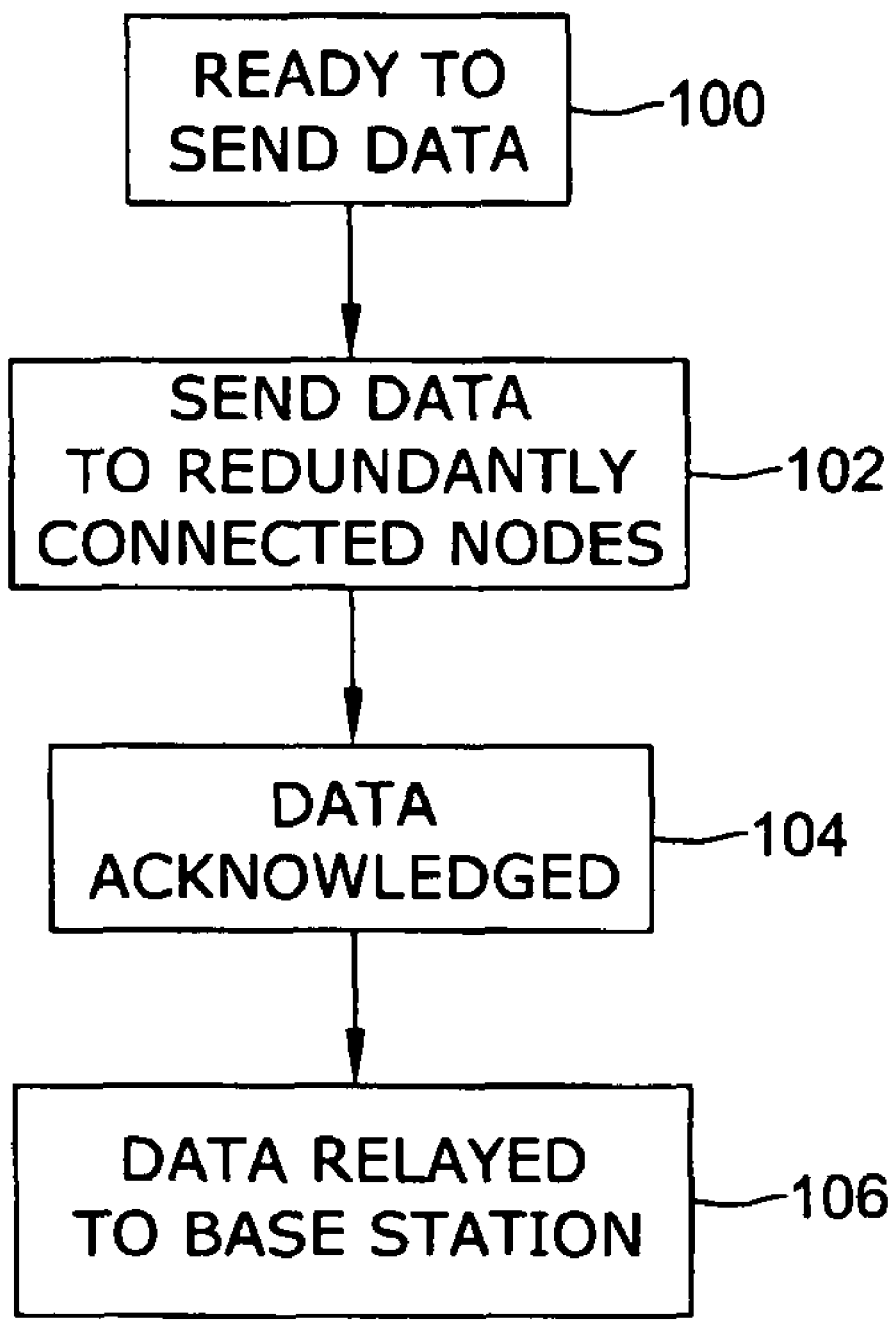
FIG. 2 shows an illustrative method of sending data.

FIG. 2 shows an illustrative method of sending data from a redundantly connected data sending node. For example, the method shown in FIG. 2 may be used to relay data from an L-node to redundantly connected I-nodes. First, the data sending node determines it is ready to send data, as shown at 100. This may include entering an "awake" state (as opposed to a sleep mode) and/or determining that an event flag has been set for determining that data should be sent, for example, an event flag related to a sensed event or an event flag related to expiration of a time period. Interrupts or any other suitable software or hardware feature may be used in place of the flags.

Once the data sending node is ready to send, the next step sends data to the redundantly connected nodes, as shown at 102. In some illustrative examples, the redundantly connected nodes may be parsed into a primary node and a secondary node. For some examples, step 102 may include a single data transmission intended for receipt at multiple redundantly connected nodes. In other embodiments, step 102 may include sending data to a first redundantly connected node and later, or sometimes simultaneously, on a different channel, sending data to a second redundantly connected node.

After the data is sent, the data sending node may wait for the sent data to be acknowledged, as shown at 104. In some embodiments, if no acknowledgement is received, the data may be resent after time-out period. The data may be acknowledged by a node that receives the data, which then relays the data to the base station, as shown at 106. In other embodiments, more than one receiving node may acknowledge the data.

Figure 3:
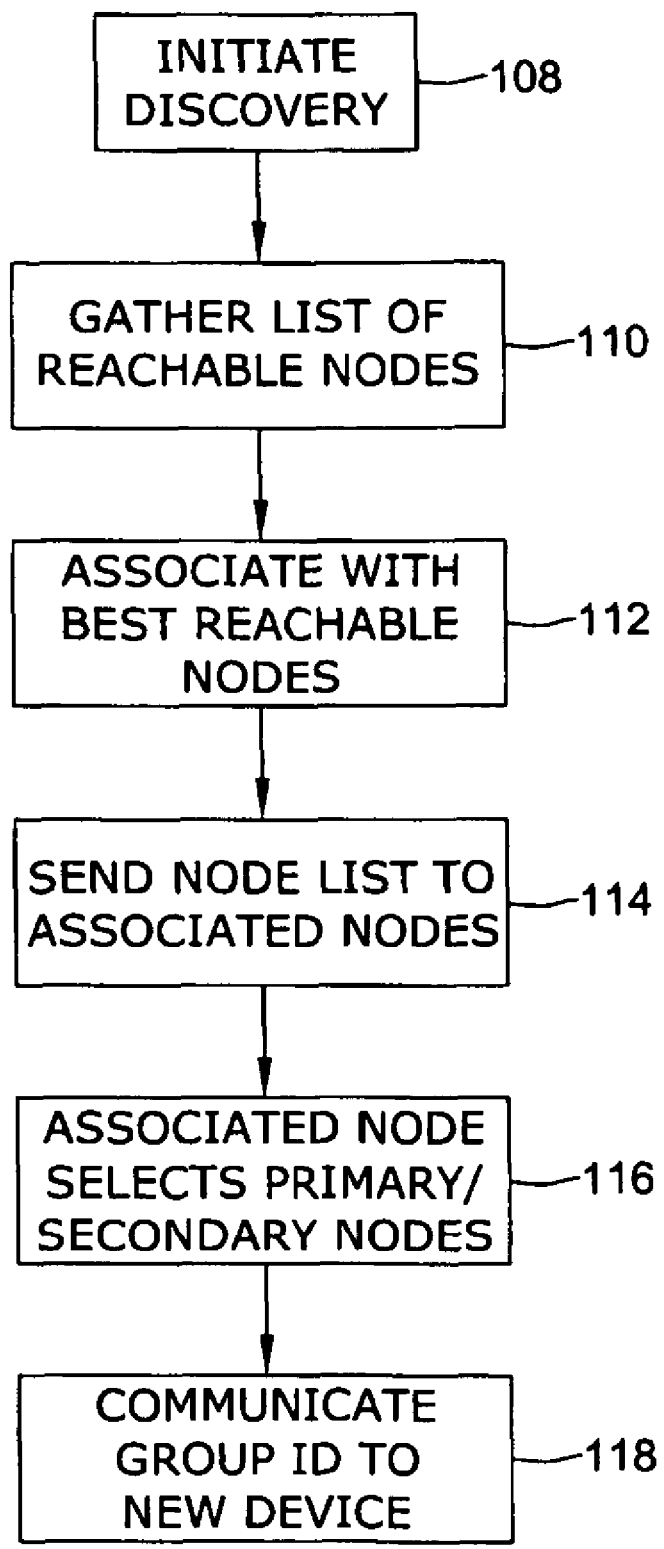
FIG. 3 shows an illustrative method for adding a new device to a network.

FIG. 3 shows an illustrative method for redundantly adding a new device to a network. The method begins when the new device initiates discovery, as shown at 108, by transmitting a discovery "beacon", a message including address information and device type information, for example. Devices that receive the discovery beacon may respond with a signal indicating address information and sometimes providing additional information including, for example, a received signal strength indicator. The new device may then use the responsive signals to gather a list of reachable nodes, as shown at 110. The new device then seeks to associate itself with the best reachable node from the list, as shown at 112. This may occur by sending an addressed message to the desired node, which, if it receives the message and is available, responds with an acknowledgement to become an "associated node". For example, the new device may associate itself with a node indicating the highest received signal strength.

Next, as shown at 114, the new device may send the gathered node list to the associated node. The associated node may then select a primary/secondary node combination, as shown at 116. For example, the associated node may communicate with other devices in the gathered node list to determine which is the most readily available, has the most available bandwidth, and/or has the best signal strength or signal-to-noise ratio in its communications with the new device. The associated node may then name which device (itself or the other selected device) will become the primary node, and which will be the secondary node, as shown at 116. In some embodiments, and as shown at 118, the associated node will identify a group address or identifier for use in addressing communications within the group, and will communicate this to the other selected node as well as the new device. For example, during redundant communication, the use of a group address or identifier allows a single communication from the new device to be received by both the primary and the secondary nodes without referring to an access control list.

In one embodiment, the group address or group ID can be selected from an available set of group addresses. For example, certain network solutions set aside memory allowing 64,000 or so device addresses to be used within the network. This memory may be subdivided to include a domain for device addresses and a domain for group addresses.

In some embodiments, a group address may be re-used such that several leaf nodes may communicate to the same group of two I-node devices using a single group address. Rather than requiring a separate group for each L-node, the network thereby may have fewer groups, and grouped devices may simply copy a portion of received messages corresponding to the sending device address in any ACK to prevent data collisions for multiple sending devices. This may reduce the need for group address space and simply receipt of messages by a group. In some embodiments, more than two I-nodes may receive messages as part of a group. For example, an L-node may generate a data packet that is received by three or more I-nodes.

FIGS. 4A-4F show several redundant communication methods. The examples in FIGS. 4A-4F refer to channels X and Y; it should be understood that instead of a single channel, channels X or Y may refer to the channels traversed by a channel hopping sequence or multiple channels used during a CDMA sequence, for example. The use of channels X and/or Y in each example may be coordinated with the listening sequence of nearby nodes in any suitable manner, including some of the methods set forth in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, and copending U.S. patent application Ser. No. 10/905,971, entitled WIRELESS ROUTING SYSTEMS AND METHODS, filed Jan. 28, 2005, the disclosures of which are incorporated herein by reference. For example, a designated time and channel for transmission may be selected in advance during a previous communication between nodes. Such scheduling may take place and be communicated in any suitable manner.

Figure 4A:
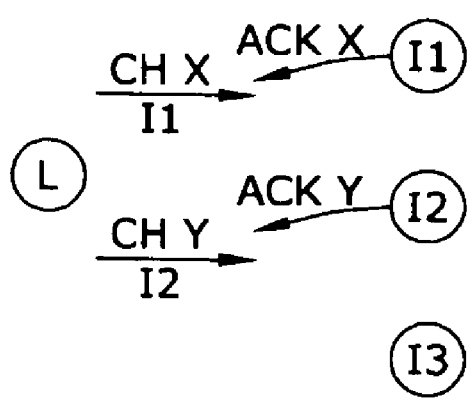
FIGS. 4A-4F show several redundant communication methods.

FIG. 4A illustrates communication of a data message from an L-node, L, to first and second I-nodes, I1, I2. FIG. 4A shows dual channel communication by L: the data message is sent on channel X and addressed to I1, and also sent on channel Y and addressed to I2. If I1 receives the message, it sends an ACK on channel X and, likewise, if I2 receives the message, it sends an ACK on channel Y. I3, because it is not addressed in either message, does not acknowledge either signal. As can be seen, two transmissions are needed in FIG. 4A, increasing the power drain on device L.

Figure 4B:
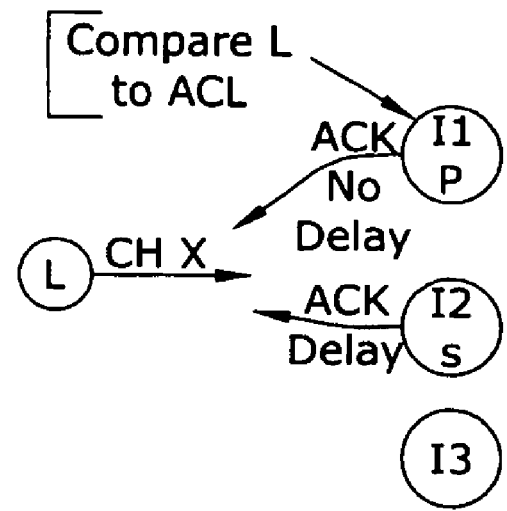

FIG. 4B illustrates communication of a data message from L to nodes I1 and I2. Node I1 is denoted the primary node for receipt of messages from L, while node I2 is a secondary node. The designation of primary and secondary nodes may occur as shown above in FIG. 3; it should be noted here that the embodiment shown in FIG. 4B does not call for step 118 (designation of a group address) in FIG. 3. L sends a single message on channel X, which is received by each of I1, I2, and I3, which compare the message source, L (indicated in the data message) to an access control list (ACL) for each device. I1 and I2 find that L is on their respective ACLs, and therefore will retransmit the data message to the base station (not shown). I3 discards the data message because the sending device is not found on its ACL. The comparison to an ACL is computationally more complicated than looking at an indicator of to whom the message is addressed, since a plurality of addresses are contained in the ACL. Next, the primary device (in this case I1) sends an ACK to L, while the secondary device (in this case, I2) may simply not send the ACK if the ACK from I1 is detected, or may wait a delay period before sending an ACK to avoid colliding with the ACK from I1.

Figure 4C:
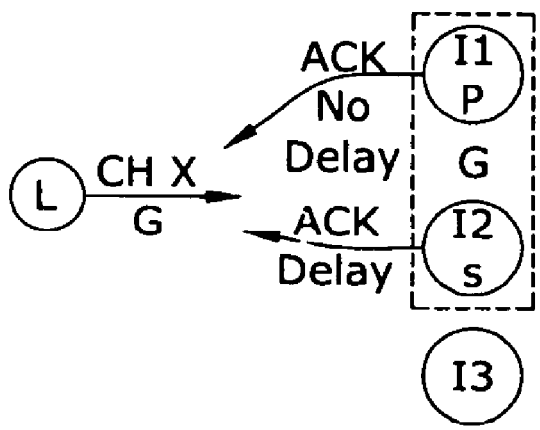

FIG. 4C illustrates a method incorporating group addressing. For the devices shown in FIG. 4C, step 118 in FIG. 3 may be performed to establish a group ID or address. L sends its message on channel X, addressed to group G. I1 and I2 determine that the message is addressed to G, a group each is a part of, while I3 is not a part of group G and therefore discards the message. Again, I1 determines it is the primary device in the group G and sends an ACK, while I2 delays before sending the ACK to avoid data collision. Alternatively, the secondary device I2 may not send an ACK at all, or may determine that the primary device I1 sent an ACK such that I2 does not need to send one as well.

Figure 4D:
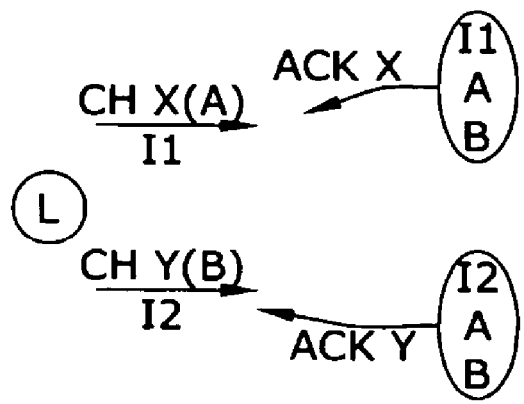

FIG. 4D illustrates a method wherein two sub-networks are defined having separate dedication of signals, with a first sub-network A using a defined block of frequencies including X, and sub-network B using a different block of frequencies excluding X but including Y. L makes use of frequencies in both sub-networks to address device I1 in network A using channel X, and device I2 in network B using channel Y. The ACK signals from I1 and I2 do not collide because they are sent on different networks having non-overlapping frequencies.

Figure 4E:
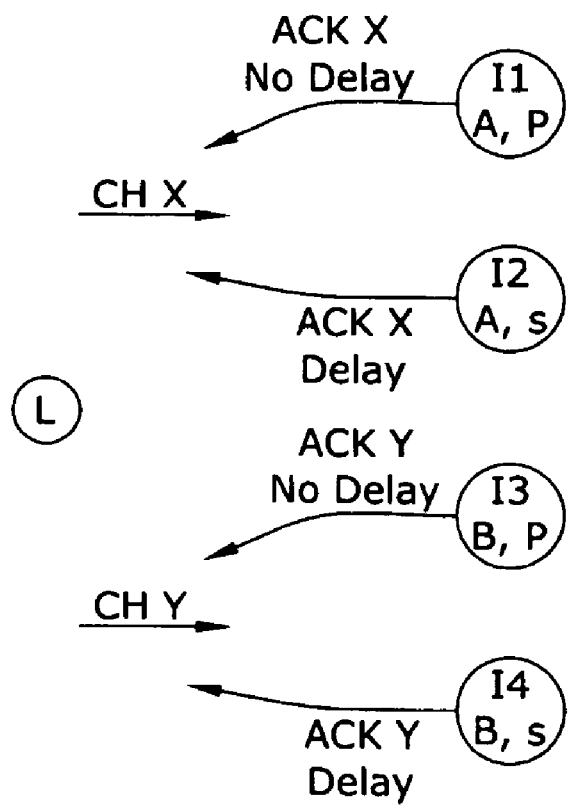

FIG. 4E further extends the redundancy from FIG. 4D by calling for each of networks A, B to include primary and secondary devices, which may or may not be grouped devices, for communicating with L. More particularly, it can be seen that a first message is sent by L on channel X using network A. Devices I1, I2 may respond to this message either using a lookup table, ACL, or the above noted group methods, again using their designations as primary and secondary to determine whether and when an ACK is sent. Device L also sends the message on channel Y, using network B. Devices I3, I4 respond as appropriate for their configuration in similar fashion to I1 and I2, though I3 and I4 are on a different network B. This embodiment gives double redundancy on two networks.

Figure 4F:
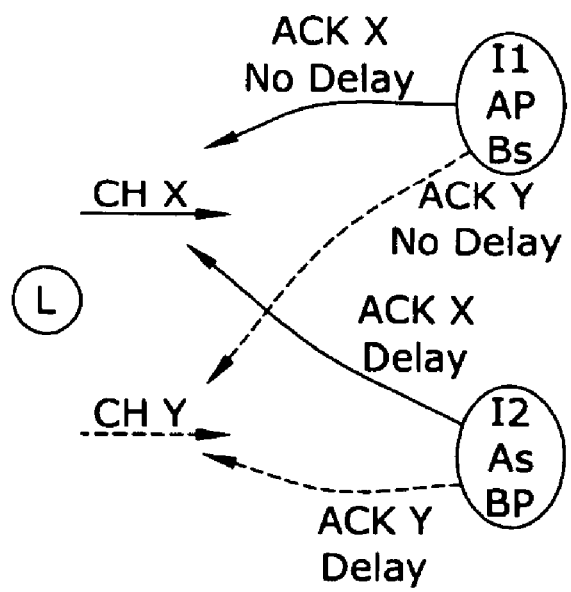

FIG. 4F shows another form of double redundancy. In this embodiment, L generates a first message on X. I1 and I2 each receive the message and determine the message is intended for their receipt. Because I1 is primary on network A, which uses channel X, I1 sends the ACK first and I2 sends the ACK later. If L receives one and/or the other ACK, then L is done. If L does not receive either ACK (in some embodiments, both ACK messages are needed), L repeats the message on channel Y using network B. Because I2 is primary on network B, I2 responds with the first ACK, and I1 sends an ACK after a delay. The second transmission by L only occurs if the first fails to yield an ACK that L receives and processes. Therefore, the second transmission may not always occur, saving power over the embodiment shown in FIG. 4E. The second message may also be sent from L to two different I-nodes rather than to I1 and I2 again.

Figure 5:
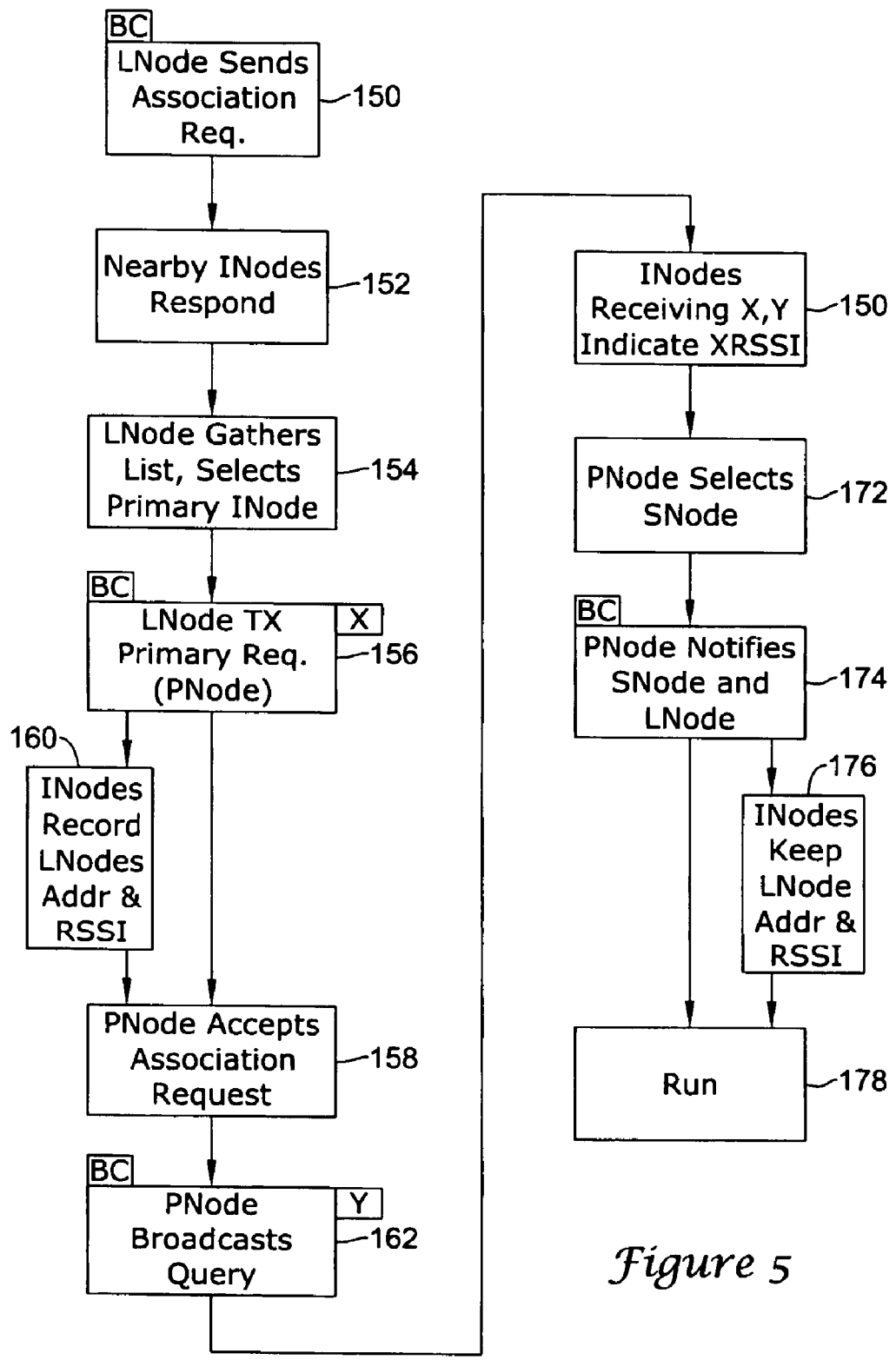
FIG. 5 illustrates a method for adding a new device to a network.

FIG. 5 illustrates another method for adding a new device to a network and establishing a group. First, as shown at 150, an L-node sends an association request. As shown at 152, nearby I-nodes respond. The L-node gathers a list of available I-nodes and selects a primary I-node, as shown at 154. The L-node transmits a request to the selected I-node, as shown at 156. The selected I-node may then accept the association request (unless for some reason the I-node is overloaded, overused, or otherwise unavailable) as shown at 158, and becomes designated the primary node or P-node. If the selected I-node does not accept the P-node designation, then the L-node may select a different P-node. In parallel to this event, the other I-nodes may record the L-node address and receiver signal strength indicator (RSSI), as shown at 160.

Next, the P-node broadcasts a query, as shown at 162, requesting data from other I-nodes that received message X sent by the L-node at step 156. Other I-nodes that received both X and message Y sent at 162 will respond to indicate the RSSI for message X, from the leaf node, as shown at 170. From this data, the P-node selects a secondary node from the other I-nodes, as shown at 172. Next, the P-node broadcasts a signal notifying the chosen I-node that it is to be the secondary node or S-node, as shown at 174. The other I-nodes that received messages X and Y may store the L-node address and RSSI data in memory, as noted at 176. This data may later be used if one of the P-node or S-node becomes unavailable and must be replaced. The L-node, P-node, and S-node then go into a network level run state wherein ordinary communication occurs, as shown at 178. While in the network level run state, the L-node may enter a sleep mode and periodically or occasionally wake up to transmit data to the P-node and S-node, for example, as set forth in one of FIGS. 4A-4F.

Depending upon the configuration in use, several embodiments may be defined. For example, the P-node and S-node may add the L-node to their respective ACLs. Alternatively, in another embodiment, a group address may be defined for data transmission purposes. While in some embodiments, one of the P-node, S-node, or L-node may provide a group address definition, in other embodiments a request may be generated and sent to the base node for identifying a group address, allowing the base node to readily keep track of group addresses in use.

Figure 6:
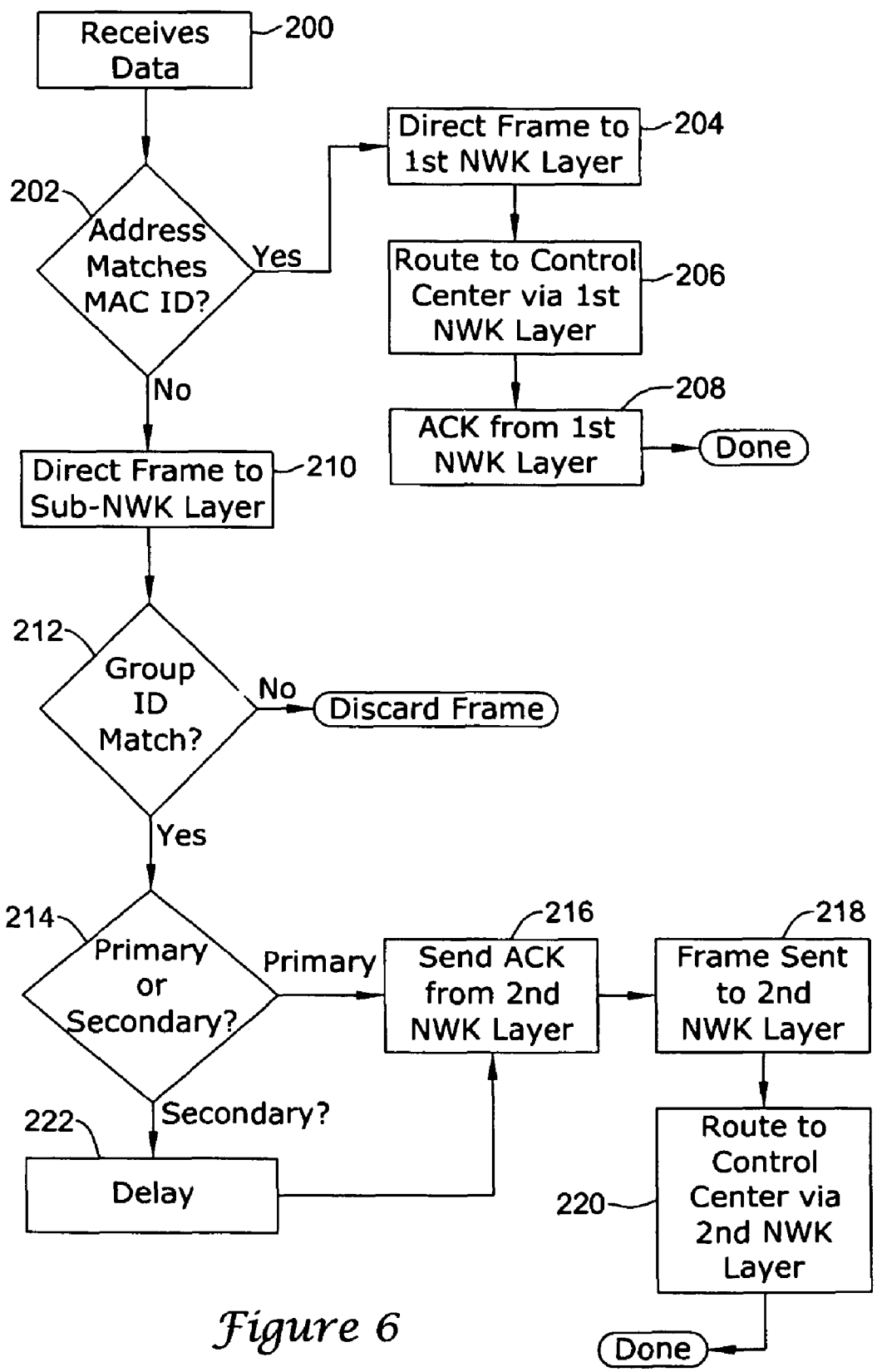
FIG. 6 illustrates an infrastructure node operation for receiving and retransmitting data.

FIG. 6 shows illustrative node operation for receiving and retransmitting data. First, the data transmission device (which is, in this instance, an I-node having FFD capabilities) receives data, as shown at 200, which may include basic data checking methods such as parity checking. Next, it is determined whether the address of the data matches the medium access control (MAC) identifier, as shown at 202. This MAC identifier is used for the first network layer. If query 202 gets a YES, the frame is directed to the first network layer, as noted at 204, and routed to the control center or base node via the first network layer, as shown at 206. An ACK is also generated, again, coming from the first network layer, as shown at 208.

If step 202 yields a NO, the frame is directed to a sub-network layer, as shown at 210. The next check is whether there is a group ID match—in accordance with an embodiment in which the data transmission node is part of at least one communicating group, as shown at 212. If the frame does not match any group ID for the device, the frame is discarded, as noted. Otherwise, the method goes to step 214, where it is determined whether the device is a primary or secondary device in the group. If the device is the primary device, an ACK is sent by the second network layer, as noted at 218. The frame is then sent to the second network layer, as shown at 218, and routed to the control center via the second network layer, as shown at 220. Going back to step 214, if the device is a secondary device for the group, then a delay may occur, as shown at 222, before the method returns to step 216.

For the illustrative example shown in FIG. 6, the first network layer may be, for example, a Zigbee protocol layer or any suitable communication layer. The second network layer may be a network layer using a different communications protocol. For example, if the first network layer is configured for a Zigbee protocol, the second network layer may use, for example, a redundant network method such as one of the methods set out in copending U.S. patent application Ser. No. 10/870,295.

Figure 7:
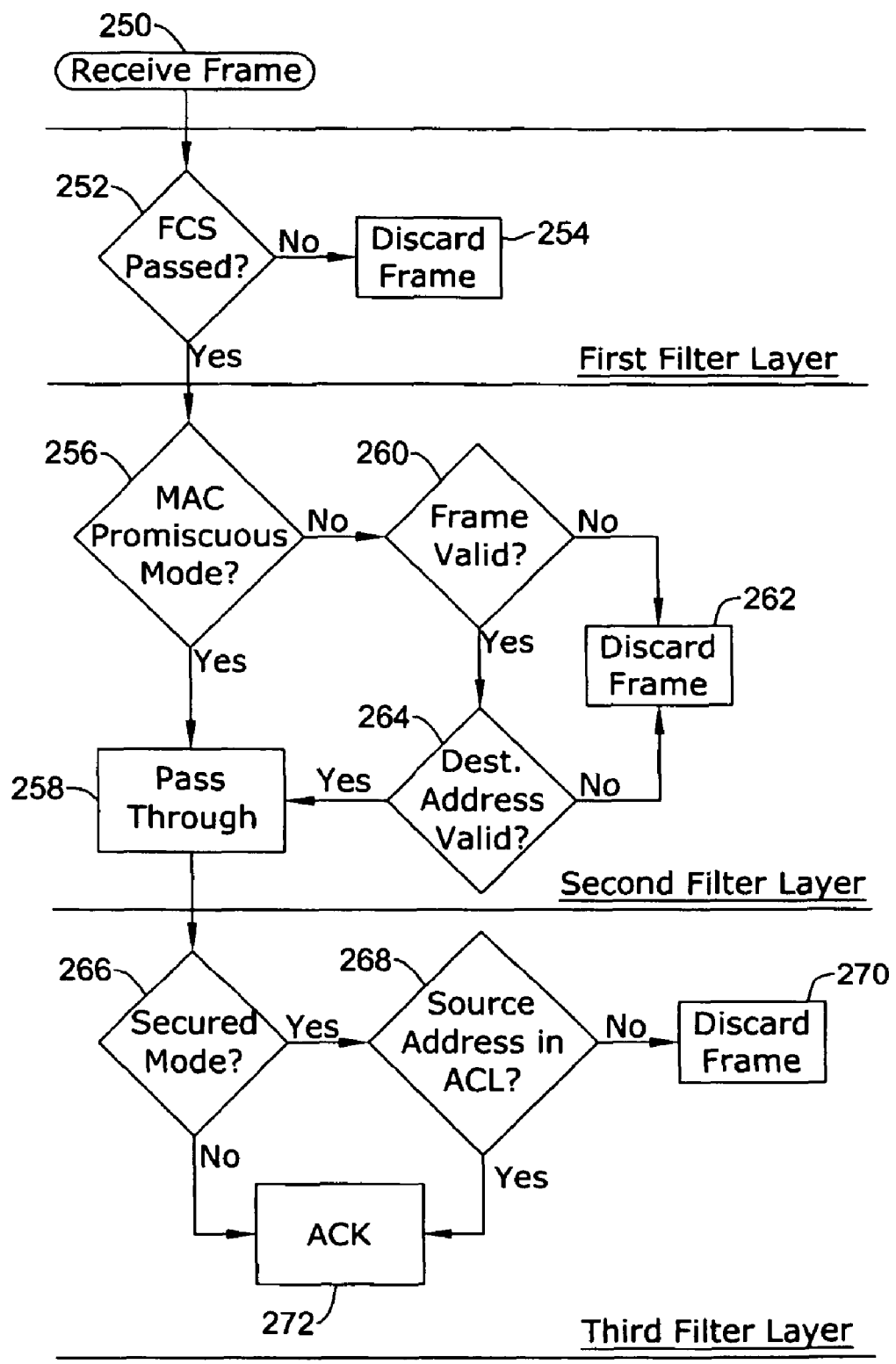
FIG. 7 illustrates a tiered filtering operation for a receiving method.

FIG. 7 shows an illustrative tiered filtering operation for a receiving method. After a frame is received at 250, the method goes to a first filter layer. The frame check sequence (FCS) is considered, as shown at 252, and, if not passed, the frame is discarded as shown at 254. The FCS may be, for example, a cyclic redundancy check, a parity check, or any other suitable method of detecting error in the received frame. If the FCS is passed at step 252, the frame is passed to the next filter layer.

In the second filter layer of the illustrative embodiment, it is determined whether the device is operating in a medium-access-control promiscuous mode, as shown at 256. If so, the frame passes through at step 258 to the third filter layer. Otherwise, the frame is sent to step 260, where it is determined whether the frame is a valid frame. If not, the frame is discarded at 262. If the frame is a valid frame at 262, then the destination address is checked at step 264 to see if the receiving device is the addressee. If not, the frame is discarded as shown at 262. If the frame and destination address are both valid, the frame is passed through as noted at 258 to the third layer of filtering.

When in the third layer of filtering of the illustrative embodiment, it is first determined whether the device is operating in a secured mode, as shown at 266. If not, then the received data may be acknowledged, as shown at 272. If the device is in a secured mode, then the method includes observing whether the source address is in the ACL, as shown at 268. If so, the ACK is sent at 272, and if not, the frame is discarded for security reasons, as shown at 270.

Figure 8:
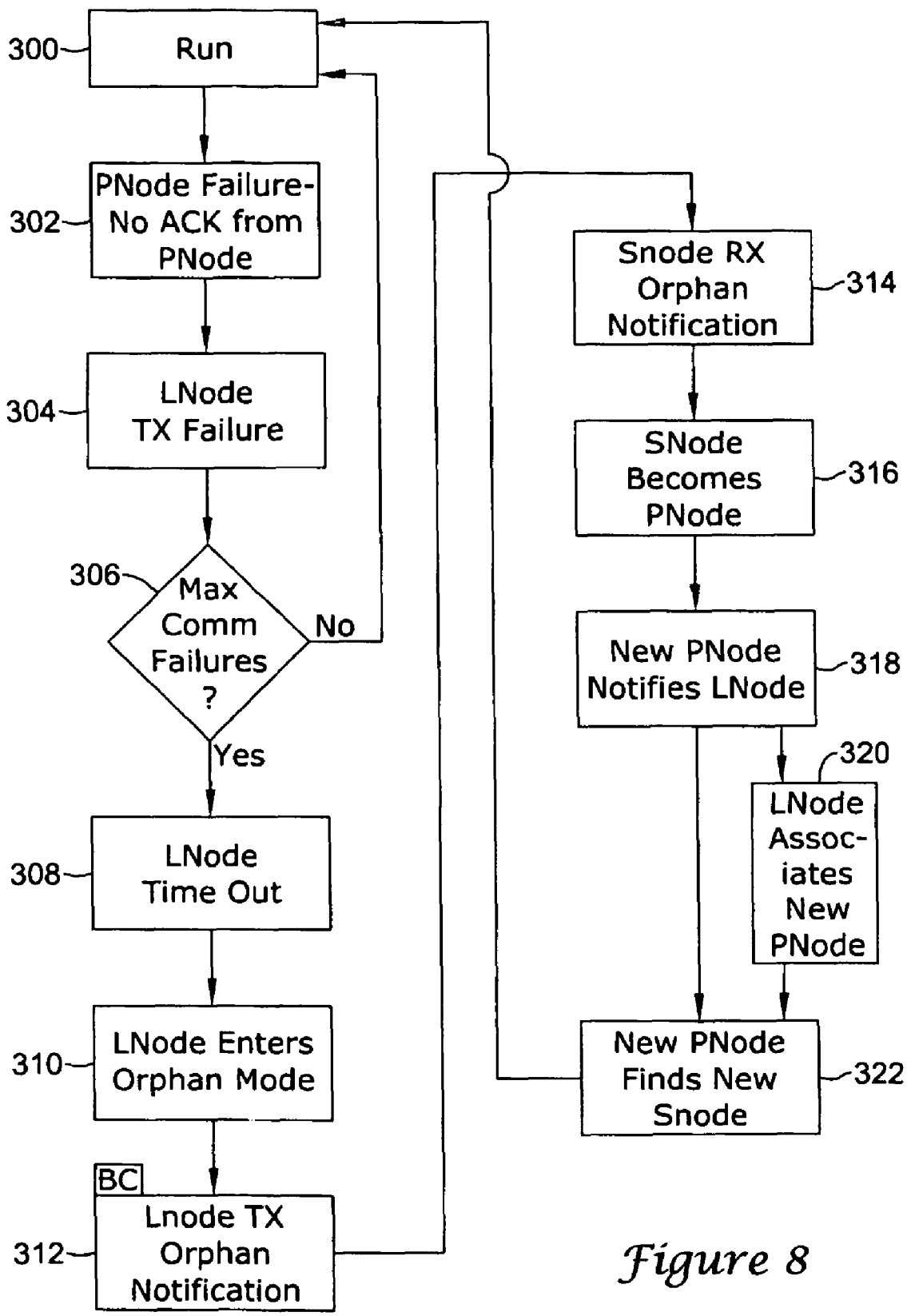
FIG. 8 illustrates a method of re-associating a node with a network after it loses primary communication association.

FIG. 8 illustrates a method of re-associating a node with a network after it loses primary communication association. From a run state 300, during which any number of communications take place between an L-node and its associated P-node and S-node, a P-node failure takes place, as shown at 302, wherein no ACK is received by the L-node from the P-node in response to an L-node communication. If no such ACK is received, this may cause the L-node to determine there has been a transmission failure, as shown at 304 (this may occur even if the S-node sends an ACK which is received by the L-node, if the P-node ACK is missing). If so, then it is determined by the L-node whether there have been a predetermined maximum number of communications failures, as shown at 306. If the result at 306 is a NO, a transmission failure counter may be incremented, and the device returns to the run state 300, where the unacknowledged transmission may be retried.

If, instead, the maximum communications failures test is a YES at 308, the L-node may time out, as shown at 308, and enter an orphan mode, as shown at 310. Once in orphan mode, the L-node transmits, using a broadcast signal (as best the L-node can with what may be limited power) an orphan notification, as shown at 312. If the secondary node designated for the L-node receives the orphan notification, as shown at 314, then the S-node will redesignate itself as the P-node, as shown at 316. The new P-node will notify the L-node of the change of P-node. In response, the L-node makes the association with the new P-node, as shown at 320, while, at the same time, the new P-node will identify and notify a new S-node. Once a new P-node and S-node are identified and the L-node is configured for the new P-node and S-node, the system returns again to a run state 300.

It may be noted that during the time period relevant for a method such as that shown in FIG. 8, other devices in the network preferably continue to operate in their normal manner. The I-node level devices (the P-node, the new P-node, and the new S-node) may continue to operate as data transferring devices with respect to communications going on between other elements of the network and the base node.

The present invention, in an illustrative embodiment, includes a method of operating a communication system comprising a number of devices suited for wireless communication. The illustrative method comprises providing at least a number of infrastructure nodes and number of leaf nodes, the leaf nodes adapted to exchange messages with the infrastructure nodes, the infrastructure nodes being adapted to exchange messages with leaf nodes and infrastructure nodes; and configuring a leaf node to associate with at least two infrastructure nodes and send a data packet to each of the two infrastructure nodes simultaneously via a first transmission, wherein each associated infrastructure node for the leaf node, if the first transmission is received, determines whether the leaf node is an associated leaf node and, if so, directs the data packet toward a destination. Another illustrative method may be such that the communication system is compatible with devices complaint to IEEE 802.15.4 specification. Yet another illustrative method may also be such that at least some of the leaf nodes are energy constrained devices.

In another illustrative method, the at least two infrastructure nodes associated with the leaf node include a primary node and a secondary node and, in response to the first transmission, the primary node sends an acknowledgement if the first transmission is received by the primary node; and the secondary node waits for the primary node to send an acknowledgement before sending an acknowledgement if the first transmission is received by the secondary node. In a further illustrative method, if the leaf node does not receive an acknowledgement from either the primary node or the secondary node, the leaf node re-sends the data packet in a second transmission.

In yet another example method, the two infrastructure nodes associated with the leaf node include a primary node and a secondary node; when the leaf node associates with the two infrastructure nodes, the leaf node indicates a primary node among the two infrastructure nodes, and the primary node selects a group address and communicates the group address to the leaf node and the secondary node; and when the leaf node sends the first transmission, the group address is included in the first transmission. In a further embodiment, if the first transmission is received by each of the two infrastructure nodes, the primary node generates an acknowledgement and the secondary node generates an acknowledgement after waiting for a delay period. In yet another illustrative method, after the first transmission is received by the secondary node, the secondary node waits a delay period to determine whether the primary node generates an acknowledgement and, if not, the secondary node generates an acknowledgement.

In an illustrative method, the infrastructure nodes and leaf nodes may be part of a sub-network layer operating in cooperation with a first network layer, the method further including at least a first infrastructure node performing the following sequence: receiving a data signal; determining whether the data signal includes an address matching a medium access control identifier, and, if so, directing the data signal to a first network layer, routing the data signal to a destination node for the first network layer using the first network layer, and generating a signal acknowledging receipt of the data signal; if not: directing the data signal to a sub-network layer. The method may further include determining whether the data signal includes an address matching a group identifier associated with the first infrastructure node and, if not, discarding the data signal; or, if so: routing the data signal using a sub-network layer to a destination node for the sub-network layer.

In another illustrative embodiment, the present invention includes a method of operating a communication system comprising a number of devices suited for wireless communication, the method comprising: providing at least a number of infrastructure nodes and number of leaf nodes, the leaf nodes adapted to exchange messages with the infrastructure nodes, the infrastructure nodes being adapted to exchange messages with leaf nodes and infrastructure nodes; and configuring a leaf node to associate with at least two infrastructure nodes and send a data packet as follows: in a first transmission, the leaf node sends the data packet to a first of the at least two infrastructure nodes by addressing the data packet to the first infrastructure node; in a second transmission, the leaf node sends the data packet to a second of the at least two infrastructure nodes by addressing the data packet to the second infrastructure node. The method may be such that the first infrastructure node sends an acknowledgement of the first transmission if the first transmission is successfully received by the first infrastructure node; and the leaf node performs the second transmission after the first transmission only if the leaf node does not receive acknowledgement of the first transmission from the first infrastructure node. In a further embodiment, the second infrastructure node sends an acknowledgement of the second transmission if the second transmission is performed by the leaf node and successfully received by the second infrastructure node. In yet another embodiment, if the leaf node does not receive an acknowledgement from either the primary node or the secondary node after performing the first transmission and the second transmission, the leaf node re-sends the data packet.

In another illustrative embodiment, the leaf node may perform both the first transmission and the second transmission regardless whether the first transmission is acknowledged by the first infrastructure node. The leaf node may be an energy-constrained-device. In some embodiments, the communication system is compatible with devices complaint to IEEE 802.15.4 specification. The first transmission may be performed on a first communication channel and the second transmission may performed on a second channel. In another embodiment, both the first transmission and the second transmission may be performed on a single communication channel.

Yet additional embodiments of the present invention may include systems configured for performing the above methods. One such embodiment includes a communication system comprising at least a number of infrastructure nodes and number of leaf nodes, the leaf nodes adapted to exchange messages with the infrastructure nodes, the infrastructure nodes being adapted to exchange messages with leaf nodes and infrastructure nodes; wherein a leaf node associates with at least two infrastructure nodes; the leaf node sends a data packet to the two infrastructure nodes simultaneously via a first transmission; and each associated infrastructure node for the leaf node that receives the first transmission determines whether the leaf node is an associated leaf node and, if so, directs the data packet toward a destination. In another system embodiment, the two infrastructure nodes associated with the leaf node include a primary node and a secondary node and, in response to the single transmission: the primary node sends an acknowledgement if the single transmission is received by the primary node; and the secondary node waits for the primary node to send an acknowledgement before sending an acknowledgement if the single transmission is received by the secondary node.

In yet another embodiment, the two infrastructure nodes associated with the leaf node include a primary node and a secondary node; when the leaf node associates with the two infrastructure nodes, the leaf node indicates a primary node among the two infrastructure nodes, and the primary node creates a group address and communicates the group address to the leaf node and the secondary node; and, when the leaf node sends the first transmission, the group address is included in the single transmission.

Another illustrative embodiment includes a communication system comprising at least a number of infrastructure nodes and number of leaf nodes, the leaf nodes adapted to exchange messages with the infrastructure nodes, the infrastructure nodes being adapted to exchange messages with leaf nodes and infrastructure nodes, wherein a leaf node associates with at least two infrastructure nodes and sends a data packet as follows: in a first transmission, the leaf node sends the data packet to a first of the at least two infrastructure nodes by addressing the data packet to the first infrastructure node; in a second transmission, the leaf node sends the data packet to a second of the at least two infrastructure nodes by addressing the data packet to the second infrastructure node.

Yet another illustrative embodiment of the present invention includes a method of operating a communication system comprising a number of devices suited for wireless communication, the method comprising: providing at least a number of infrastructure nodes and number of leaf nodes, the leaf nodes adapted to exchange messages with the infrastructure nodes, the infrastructure nodes being adapted to exchange messages with leaf nodes and infrastructure nodes; and configuring a leaf node to associate with at least two infrastructure nodes and send a data packet as follows: in a first transmission on a first communication channel, the leaf node sends the data packet to the at least two infrastructure nodes; and in a second transmission on a second communication channel, the leaf node sends the data packet to the at least two infrastructure nodes.

The communication system may be compatible with devices complaint to IEEE 802.15.4 specification. The at least one associated infrastructure node may include first and second transceiving means for wireless communication, the first and second transceiving means being configured to simultaneously operate on different channels. At least some of the leaf nodes may be energy constrained devices.

In a further method embodiment, the at least two infrastructure nodes associated with the leaf node include a primary node and a secondary node and, in response to the first transmission: the primary node sends an acknowledgement if the first transmission is received by the primary node; and the secondary node waits for the primary node to send an acknowledgement before sending an acknowledgement if the first transmission is received by the secondary node. In yet another embodiment, the leaf node executes the first transmission and, if the leaf node does not receive an acknowledgement from either the primary node or the secondary node, the leaf node executes the second transmission.

In another further embodiment, the at least two infrastructure nodes are configured to send an acknowledgement of transmissions received from the leaf node, wherein the leaf node executes the first transmission and the second transmission, and: if the leaf node receives acknowledgement of the first transmission but not of the second transmission, the leaf node executes the second transmission again; if the leaf node receives acknowledgement of the second transmission but not of the first transmission, the leaf node executes the first transmission again; or if the leaf node does not receive acknowledgement of either the first transmission or the second transmission, the leaf node executes the first transmission and the second transmission again. Another embodiment is configured such that the two infrastructure nodes associated with the leaf node include a primary node and a secondary node; and: if the primary node receives the first transmission, the primary node sends an acknowledgement; or, if the secondary node receives the first transmission, the secondary node sends an acknowledgement, the secondary node waiting for a delay period to allow the primary node to send an acknowledgement first.

In another illustrative embodiment, the two infrastructure nodes associated with the leaf node include a primary node and a secondary node; and: if the primary node receives the second transmission, the primary node sends an acknowledgement; and if the secondary node receives the second transmission, the secondary node sends an acknowledgement, the secondary node waiting for a delay period to allow the primary node to send an acknowledgement first. In yet another illustrative embodiment, the two infrastructure nodes associated with the leaf node include a primary node and a secondary node; when the leaf node associates with the two infrastructure nodes, the leaf node indicates a primary node among the two infrastructure nodes, and the primary node selects a group address and communicates the group address to the leaf node and the secondary node; and when the leaf node sends the first transmission, the group address is included in the first transmission. In a further embodiment, after the first transmission is received by the secondary node, the secondary node waits a delay period to determine whether the primary node generates an acknowledgement and, if not, the secondary node generates an acknowledgement.

In another illustrative method, the two infrastructure nodes associated with the leaf node include a primary node and a secondary node; when the leaf node associates with the two infrastructure nodes, the leaf node indicates a primary node among the two infrastructure nodes, and the primary node selects a group address and communicates the group address to the leaf node and the secondary node; and when the leaf node sends the second transmission, the group address is included in the second transmission. In yet another embodiment, the infrastructure nodes and leaf nodes are part of a sub-network layer operating in cooperation with a first network layer, the method further including at least a first infrastructure node performing the following sequence: receiving a data signal; determining whether the data signal includes an address matching a medium access control identifier, and, if so, directing the data signal to a first network layer, routing the data signal to a destination node for the first network layer using the first network layer, and generating a signal acknowledging receipt of the data signal; if not: directing the data signal to a sub-network layer; determining whether the data signal includes an address matching a group identifier associated with the first infrastructure node and, if not, discarding the data signal; else, routing the data signal using a sub-network layer to a destination node for the sub-network layer.

Another illustrative embodiment of the present invention includes a method of operating a communication system comprising a number of devices suited for wireless communication, the method comprising: providing at least a number of infrastructure nodes and number of leaf nodes, the leaf nodes adapted to exchange messages with the infrastructure nodes, the infrastructure nodes being adapted to exchange messages with leaf nodes and infrastructure nodes; and configuring a leaf node to associate with at least a first infrastructure node and a second infrastructure node and send a data packet as follows: in a first transmission on a first communication channel, the leaf node sends the data packet to the first infrastructure node by addressing a message containing the data packet to the first infrastructure node; and in a second transmission on a second communication channel, the leaf node sends the data packet to the second infrastructure node by addressing a message containing the data packet to the second infrastructure node.

In a further embodiment, the leaf node executes the first transmission and observes whether an acknowledgement is received from the first infrastructure node and, if no acknowledgement is received, the leaf node executes the second transmission. In an example embodiment, if the leaf node executes the first transmission, the leaf node also executes the second transmission. The communication system may be compatible with devices complaint to IEEE 802.15.4 specification. At least one associated infrastructure node may include first and second transceiving means for wireless communication, the first and second transceiving means being configured to simultaneously operate on different channels. At least some of the leaf nodes may be energy constrained devices.

Yet another illustrative embodiment of the present invention includes a communication system comprising at least a number of infrastructure nodes and number of leaf nodes, the leaf nodes adapted to exchange messages with the infrastructure nodes, the infrastructure nodes being adapted to exchange messages with leaf nodes and infrastructure nodes; wherein: a leaf node associates with at least two infrastructure nodes; the leaf node sends a data packet as follows: in a first transmission on a first communication channel, the leaf node sends the data packet to the at least two infrastructure nodes; and in a second transmission on a second communication channel, the leaf node sends the data packet to the at least two infrastructure nodes.

Another illustrative example includes a communication system comprising at least a number of infrastructure nodes and number of leaf nodes, the leaf nodes adapted to exchange messages with the infrastructure nodes, the infrastructure nodes being adapted to exchange messages with leaf nodes and infrastructure nodes; wherein: a leaf node associates with a first infrastructure node and a second infrastructure node; the leaf node sends a data packet as follows: in a first transmission on a first communication channel, the leaf node sends the data packet to the first infrastructure node by addressing a message containing the data packet to the first infrastructure node; and in a second transmission on a second communication channel, the leaf node sends the data packet to the second infrastructure node by addressing a message containing the data packet to the second infrastructure node.

Another illustrative embodiment includes a method of associating a data sending node with data relaying nodes in a communication system having a number of nodes adapted for wireless data transmission. The illustrative associating method comprises the data sending node initiating a discovery sequence by generating and sending a discovery beacon; at least one data relaying node that receives the discovery beacon responding by sending a discovery signal to the data sending node; the data sending node gathering a list of nodes that respond, the list including data related to one or more characteristics of the response signal for responding data relaying nodes; the data sending node selecting a primary node from among the data relaying nodes on the list; the data sending node notifying a data relaying node that it is the primary node and provides data related to the list to the primary node; the primary node analyzing the list, selecting one or more secondary nodes, and generating a group address for itself, the secondary nodes, and the data sending node; the primary node notifying other data relaying nodes that they are the secondary nodes; and the primary node indicating the group address to the secondary nodes and the data sending node. Another illustrative embodiment includes a method of sending data from a data sending node to a destination node using intermediate data relaying nodes, the method comprising: the data sending node associating itself with first and second data relaying nodes using the above illustrative associating method; the data sending node sending a data packet to the primary and secondary nodes by including the group address; and the primary and secondary nodes forwarding the data signal.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of operating a communication system comprising a number of devices suited for wireless communication, the method comprising:

providing at least a number of infrastructure nodes and number of leaf nodes, the leaf nodes configured to exchange messages with the infrastructure nodes, the infrastructure nodes being configured to exchange messages with leaf nodes and infrastructure nodes;

configuring a leaf node to associate with at least two infrastructure nodes and, once associated, send a data packet as follows:

in a first transmission on a first communication channel, the leaf node sends the data packet to the at least two infrastructure nodes;

in a second transmission on a second communication channel, the leaf node sends the data packet to the at least two infrastructure nodes; and wherein at least one associated infrastructure node includes first and second transceiving means for wireless communication, the first and second transceiving means being configured to simultaneously operate on different channels.

2. The method of claim 1 wherein the communication system is compatible with devices complaint to IEEE 802.15.4 specification.

3. The method of claim 1 wherein at least some of the leaf nodes are energy constrained devices.

4. The method of claim 1 wherein the at least two infrastructure nodes associated with the leaf node include a primary node and a secondary node and, in response to the first transmission:

the primary node sends an acknowledgement if the first transmission is received by the primary node; and the secondary node waits for the primary node to send an acknowledgement before sending an acknowledgement if the first transmission is received by the secondary node.

5. The method of claim 1 wherein the at least two infrastructure nodes are configured to send an acknowledgement of transmissions received from the leaf node, wherein the leaf node executes the first transmission and the second transmission, and:

if the leaf node receives acknowledgement of the first transmission but not of the second transmission, the leaf node executes the second transmission again;

if the leaf node receives acknowledgement of the second transmission but not of the first transmission, the leaf node executes the first transmission again; or if the leaf node does not receive acknowledgement of either the first transmission or the second transmission, the leaf node executes the first transmission and the second transmission again.

6. A method of operating a communication system comprising a number of devices suited for wireless communication, the method comprising:

providing at least a number of infrastructure nodes and number of leaf nodes, the leaf nodes configured to exchange messages with the infrastructure nodes, the infrastructure nodes being configured to exchange messages with leaf nodes and infrastructure nodes;

configuring a leaf node to associate with at least two infrastructure nodes and, once associated, send a data packet as follows:

in a first transmission on a first communication channel, the leaf node sends the data packet to the at least two infrastructure nodes;

in a second transmission on a second communication channel, the leaf node sends the data packet to the at least two infrastructure nodes; and wherein the two infrastructure nodes associated with the leaf node include a primary node and a secondary node;

when the leaf node associates with the two infrastructure nodes, the leaf node indicates a primary node among the two infrastructure nodes, and the primary node selects a group address and communicates the group address to the leaf node and the secondary node; and when the leaf node sends the first transmission, the group address is included in the first transmission.

7. The method of claim 6 wherein, after the first transmission is received by the secondary node, the secondary node waits a delay period to determine whether the primary node generates an acknowledgement and, if not, the secondary node generates an acknowledgement.

8. A method of operating a communication system comprising a number of devices suited for wireless communication, the method comprising:

providing at least a number of infrastructure nodes and number of leaf nodes, the leaf nodes configured to exchange messages with the infrastructure nodes, the infrastructure nodes being configured to exchange messages with leaf nodes and infrastructure nodes, configuring a leaf node to associate with at least two infrastructure nodes and, once associated, send a data packet as follows:

in a first transmission on a first communication channel, the leaf node sends the data packet to the at least two infrastructure nodes;

in a second transmission on a second communication channel, the leaf node sends the data packet to the at least two infrastructure nodes; and wherein the two infrastructure nodes associated with the leaf node include a primary node and a secondary node;

when the leaf node associates with the two infrastructure nodes, the leaf node indicates a primary node among the two infrastructure nodes, and the primary node selects a group address and communicates the group address to the leaf node and the secondary node; and when the leaf node sends the second transmission, the group address is included in the second transmission.

9. A method of operating a communication system comprising a number of devices suited for wireless communication, the method comprising:

providing at least a number of infrastructure nodes and number of leaf nodes, the leaf nodes configured to exchange messages with the infrastructure nodes, the infrastructure nodes being configured to exchange messages with leaf nodes and infrastructure nodes;

configuring a leaf node to associate with at least two infrastructure nodes and, once associated, send a data packet as follows:

in a first transmission on a first communication channel, the leaf node sends the data packet to the at least two infrastructure nodes;

in a second transmission on a second communication channel, the leaf node sends the data packet to the at least two infrastructure nodes;

wherein the infrastructure nodes and leaf nodes are part of a sub-network layer operating in cooperation with a first network layer, the method further including at least a first infrastructure node performing the following sequence:

receiving the data packet;

determining whether the data packet includes an address matching a medium access control identifier, and, if so, directing the data packet to the first network layer, routing the data packet to a destination node for the first network layer using the first network layer, and generating an acknowledge signal acknowledging receipt of the data packet; if not:

directing the data packet to the sub-network layer; and determining whether the data packet includes an address matching a group identifier associated with the first infrastructure node and, if not, discarding the data packet; else, routing the data packet using a second network layer to a destination node for the second network layer.

10. A method of operating a communication system comprising a number of devices suited for wireless communication, the method comprising:

providing at least a number of infrastructure nodes and number of leaf nodes, the leaf nodes configured to exchange messages with the infrastructure nodes, the infrastructure nodes being configured to exchange messages with leaf nodes and infrastructure nodes; and configuring a leaf node to associate with at least a first infrastructure node and a second infrastructure node and, once associated, send a data packet as follows:

in a first transmission on a first communication channel, the leaf node sends the data packet to the first infrastructure node by addressing a message containing the data packet to the first infrastructure node; and in a second transmission on a second communication channel, the leaf node sends the data packet to the second infrastructure node by addressing a message containing the data packet to the second infrastructure node;

wherein, if the leaf node executed the first transmission, the leaf node also executes the second transmission regardless of whether an acknowledgement is received from the first infrastructure node.

11. The method of claim 10 wherein the communication system is compatible with devices complaint to IEEE 802.15.4 specification.

12. The method of claim 10 wherein at least some of the leaf nodes are energy constrained devices.

13. A method of operating a communication system comprising a number of devices suited for wireless communication, the method comprising:

providing at least a number of infrastructure nodes and number of leaf nodes, the leaf nodes configured to exchange messages with the infrastructure nodes, the infrastructure nodes being configured to exchange messages with leaf nodes and infrastructure nodes; and configuring a leaf node to associate with at least a first infrastructure node and a second infrastructure node and, once associated, send a data packet as follows:

in a first transmission on a first communication channel, the leaf node sends the data packet to the first infrastructure node by addressing a message containing the data packet to the first infrastructure node; and in a second transmission on a second communication channel, the leaf node sends the data packet to the second infrastructure node by addressing a message containing the data packet to the second infrastructure node;

wherein at least one associated infrastructure node includes first and second transceiving means for wireless communication, the first and second transceiving means being configured to simultaneously operate on different channels.

14. A communication system comprising at least a number of infrastructure nodes and number of leaf nodes, the leaf nodes configured to exchange messages with the infrastructure nodes, the infrastructure nodes being configured to exchange messages with leaf nodes and infrastructure nodes; wherein:

a leaf node associates with a first infrastructure node and a second infrastructure node;

once associated, the leaf node sends a data packet as follows:
- in a first transmission on a first communication channel, the leaf node sends the data packet to the first infrastructure node by addressing a message containing the data packet to the first infrastructure node; and
- in a second transmission on a second communication channel, the leaf node sends the data packet to the second infrastructure node by addressing a message containing the data packet to the second infrastructure node;
- wherein, if the leaf node executed the first transmission, the leaf node also executes the second transmission regardless of whether an acknowledgement is received from the first infrastructure.

15. A method of associating a data sending node with data relaying nodes in a communication system having a number of nodes configured for wireless data transmission, the method comprising:
- the data sending node initiating a discovery sequence by generating and sending a discovery beacon;
- at least one data relaying node that receives the discovery beacon responding by sending a discovery signal to the data sending node;
- the data sending node gathering a list of nodes that respond, the list including data related to one or more characteristics of the response signal for responding data relaying nodes;
- the data sending node selecting a primary node from among the data relaying nodes on the list;
- the data sending node notifying a data relaying node that it is the primary node and provides data related to the list to the primary node;
- the primary node analyzing the list, selecting one or more secondary nodes, and generating a group address for itself, the secondary nodes, and the data sending node;
- the primary node notifying other data relaying nodes that they are the secondary nodes; and
- the primary node indicating the group address to the secondary nodes and the data sending node.

16. The method of claim 15 further comprising:
- the data sending node sending a data packet to the primary and secondary nodes by including the group address; and
- the primary and secondary nodes forwarding the data packet.

* * * * *